S. S. THOMAS.
COTTON PICKER.
APPLICATION FILED AUG. 24, 1911.

1,122,172.

Patented Dec. 22, 1914.
6 SHEETS—SHEET 3.

Fig. 3.

Witnesses:
Harry S. Gaither
Wm. F. Bond

Inventor:
Stephen S. Thomas
By Bonning & Bonning
Att'ys.

S. S. THOMAS.
COTTON PICKER.
APPLICATION FILED AUG. 24, 1911.

1,122,172.

Patented Dec. 22, 1914.
6 SHEETS—SHEET 4.

Fig. 4.

Witnesses:
Harry S. Gaither
Wm. P. Bond

Inventor:
Stephen S. Thomas
By Banning & Banning
Att'ys.

S. S. THOMAS.
COTTON PICKER.
APPLICATION FILED AUG. 24, 1911.

1,122,172.

Patented Dec. 22, 1914.
6 SHEETS—SHEET 5.

Witnesses:

Inventor:
Stephen S. Thomas
By Banning & Banning
Att'ys.

UNITED STATES PATENT OFFICE.

STEPHEN S. THOMAS, OF GULFPORT, MISSISSIPPI.

COTTON-PICKER.

1,122,172.  Specification of Letters Patent.  Patented Dec. 22, 1914.

Application filed August 24, 1911. Serial No. 645,835.

*To all whom it may concern:*

Be it known that I, STEPHEN S. THOMAS, a citizen of the United States, residing at Gulfport, in the county of Harrison and State of Mississippi, have invented certain new and useful Improvements in Cotton-Pickers, of which the following is a specification.

The machine of the present invention relates to that type of cotton picker which is adapted to enter a field of cotton and automatically remove the cotton from the plant and convey it into a receptacle. The machine differs from the cotton pickers usually employed, which are carried by the field hand, in that this machine requires only the service of one operator, whose work will consist in guiding the machine through the field. The picking operation in the present construction is performed entirely by mechanisms.

The objects of the present invention are, to provide a mechanism which will be operated in a manner to have the picking members pass through the plant with an operation similar to that of a rake, thus insuring the removal of all of the cotton from the plant; to provide a manner of mounting the picking members or teeth, whereby said members will not become broken or bent in case they should encounter an unusual obstruction, such as the stalk of the plant; to provide an air pressure which will serve to remove the cotton from the picking members and to convey the removed cotton to a receptacle; to provide means for automatically swinging the picker members from picking to non-picking position; and to provide means for rotating the picker teeth and for automatically changing the direction of rotation of the picker members.

The invention further consists in the features of construction and in the combination of parts hereinafter described and claimed.

The device of the present invention is mounted upon a truck, consisting of a bed 10 and supporting wheels 11. These may be of any well known arrangement, and the power mechanism for driving the truck, as well as the steering mechanism and other similar accessories, may be of any style well known in the art which would be of a nature adapted for use with a machine of the type of the present invention. In the construction shown in the drawings, there are three sets of picker members. It is the intention, of course, to have the appending claims cover a construction in which may be employed one or more sets of picking members. These members, however, are all alike in construction and arrangement and are all operated in the same manner. Therefore, in the following description only one of these sets of picking members will be dealt with, it being understood that the arrangement contemplates the employment of any number desired. The picking members are possibly best shown in Fig. 4, and consist of an elongated needle-like member 12, which is mounted within and carried by a yoke-shaped member 13; and said member 12 has secured at one end a friction disk 14, which is in engagement with a friction disk 15 lying in the interior of the yoke-shaped member; and the disk 15 is secured to a shaft 16 by a key or other suitable arrangement, whereby the shaft may have a longitudinal movement back and forth with respect to said disk.

Figure 3:
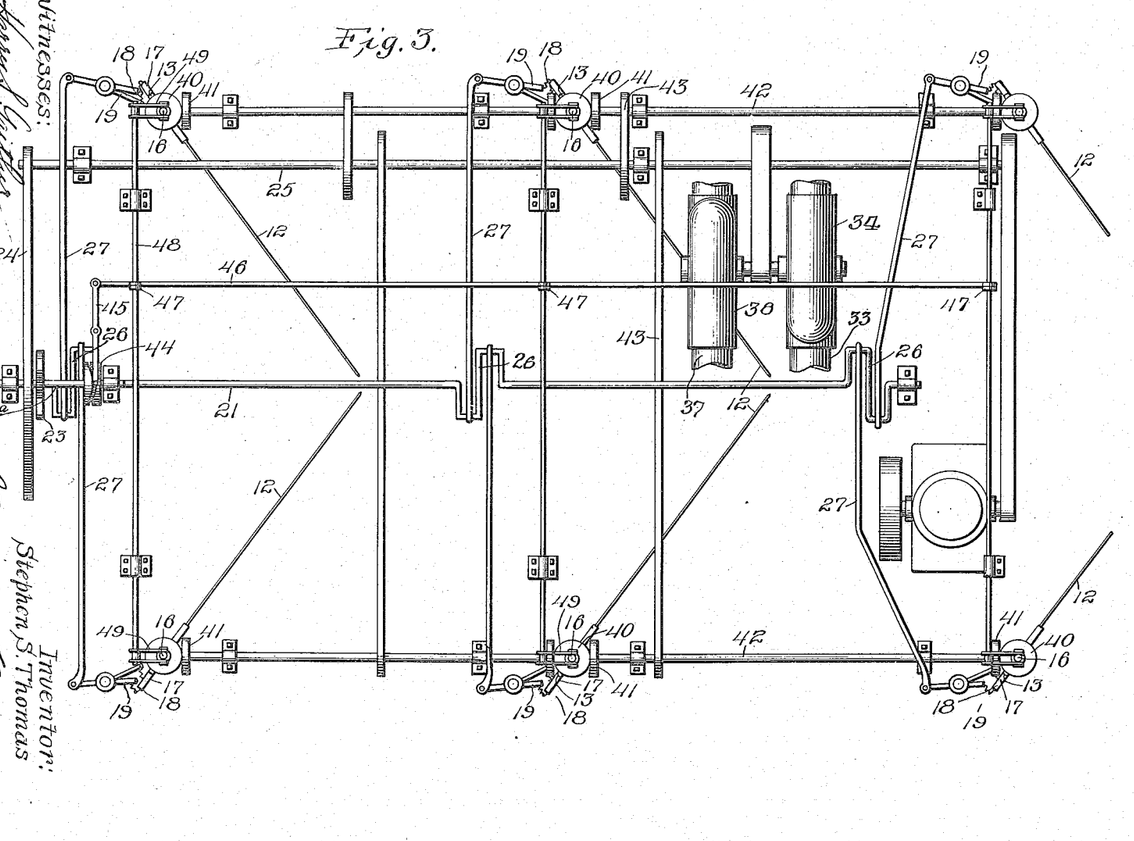
Fig. 3, a plan view of the mechanism for moving the picker members into and out of picking position, for rotating the picker members, and for reversing their direction of rotation.

The yoke member 13 is provided with a stem 17 to which is secured one end of a spring 18 best shown in Fig. 3, the other end of the spring is secured to a lever or rocking arm 19, said spring forming a resilient link or connection between the stem 17 and the rocking arm 19. By utilizing the spring 18, a mounting is provided for the picker members, whereby in case said members should encounter an obstruction, a bending or breaking of the member would not result, owing to the flexibility of the mounting, which flexibility would enable the picking member to yield to the pressure incident to its engagement with an obstruction, thereby eliminating the consequent pressure upon the member which would otherwise result. A series of coil springs 20 are mounted on the shaft 16 and such springs tend to maintain the yoke members a proper distance apart along said shaft as will be clearly understood by referring to Fig. 4. This allows the yoke members and teeth to have a certain movement longitudinally of the shaft 16, so that if the strain upon the picker member should be in this direction, the members would be permitted to yield sufficiently so as to obviate the danger of their breaking or bending.

Figures 5, 6, 9:
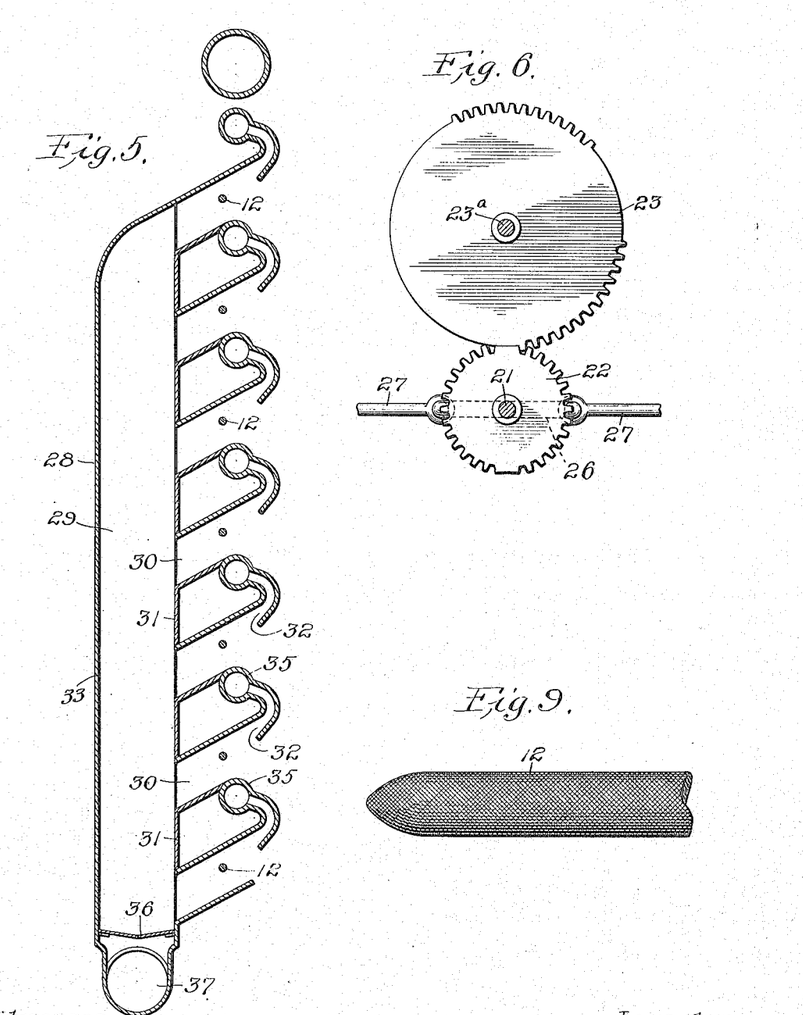
Fig. 5, a section on line 5—5 of Fig. 4, looking in the direction of the arrow.
Fig. 6, a detail showing the gear connection for driving the mechanism for operating the picker members.
Fig. 9, a detail of one of the picker members.

It might be stated at this time that each of the sets of picking mechanisms is composed of a plurality of picking members, each similar to the one heretofore described, and each mounted in a similar manner. As shown in Fig. 9, it is considered to be advantageous to knurl or serrate the faces of the picker members 12, so that they may more readily engage and extract cotton from the plant. By referring to Fig. 3, it will be seen that each set of picking mechanisms comprises oppositely disposed picking members, which, when in picking position, extend obliquely toward one another. There are, of course, several of these members, as will be seen from a study of Fig. 1, each lying in vertical alinement, so that the effect of the entire set of picking members when they are passing through the plant is that of a rake. As heretofore stated, one of the objects of the invention is to provide means for automatically moving these picking members into and out of picking position. This mechanism is probably best shown in Fig. 3, and consists of a shaft 21 having thereon a mutilated gear 22, best shown in Fig. 6; and meshing with this gear is a mutilated gear 23 mounted on a stub shaft 23ª, which is connected by a belt or chain 24 to an engine shaft 25, this latter arrangement being best shown in Fig. 3. The shaft 21 is provided with a series of cranks 26, each of which connects with a link or rod 27, which in turn is connected to one of the rocking levers 19. The operation of this portion of the mechanism is as follows: The gear 23 is a continuously driven gear, but by reason of the mutilations of it and the gear 22, there is an intermittent rotary movement imparted to the gear 22 and hence to the shaft 21. Upon one of the movements of the gear 22, the shaft 21 will be actuated to swing the cranks 26, and, through the movements of the links 27 and levers 19, pull the picking members so that they lie substantially parallel to the sides of the machine, when out of picking position. They are allowed to remain there for a predetermined period of time, owing to the mutilations of the gears 22 and 23. Upon the next movement of the cranks, due to the engagement of the teeth of the gears 22 and 23, the picker members will be swung into picking position, or the position shown in Fig. 3, and will remain there for a predetermined period of time.

Lying to the outside of the picker members are walls or sidings, which are in the nature of plate-like members and are designated in the drawings by the numeral 28. Each of these walls is hollow, as best shown in Fig. 5, to provide a chamber 29; and leading to said chamber are a series of troughs or recesses 30, which are separated from one another by chamber-like members 31. It is understood that the troughs and the chambered members are positioned on the plate 29 so that they extend parallel to the picking members when said members are drawn out of picking position. Each of the chambered members 31 terminates in a nozzle or configured outlet 32, which has its open end directed toward the troughs 30; and the pipe 33, best shown in Fig. 1, leading from a fan 34, extends along each of the chambered members 31 and communicates with a nozzle 32, whereby a draft of air is forced through the pipes 35 extending through the chambers 31 and is ejected through the nozzle or open end 32.

Figure 1:
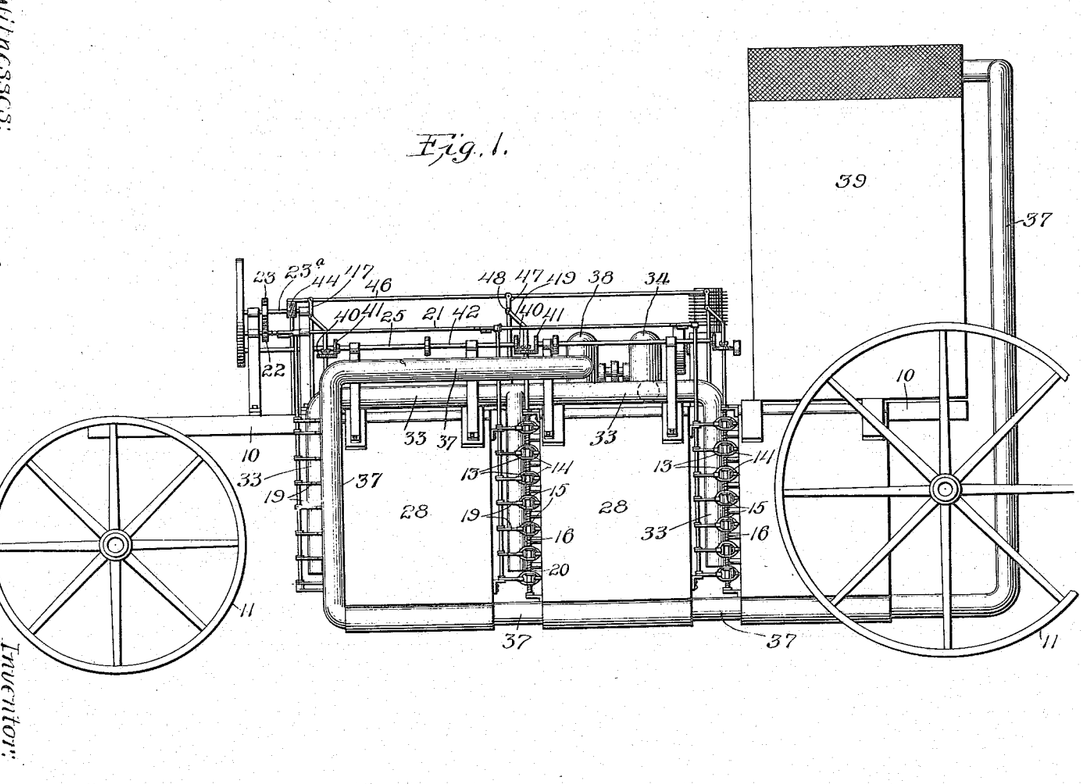
Figure 1 is a side elevation of the machine of the present invention.
Figure 2:
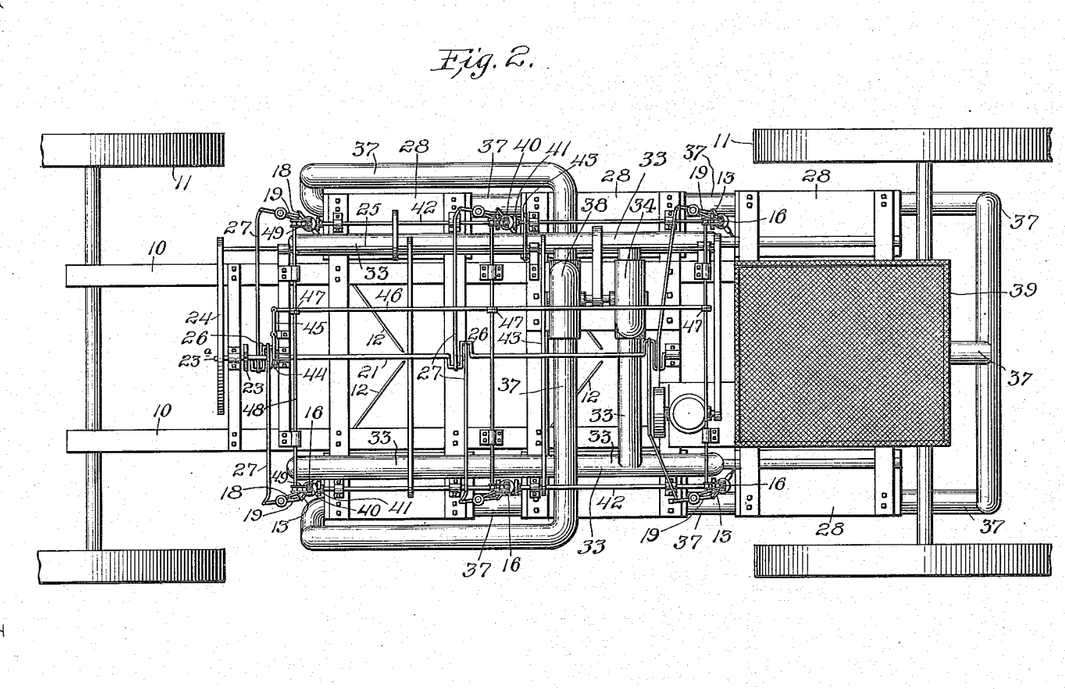
Fig. 2, a plan view of the parts shown in Fig. 1.
Figure 4:
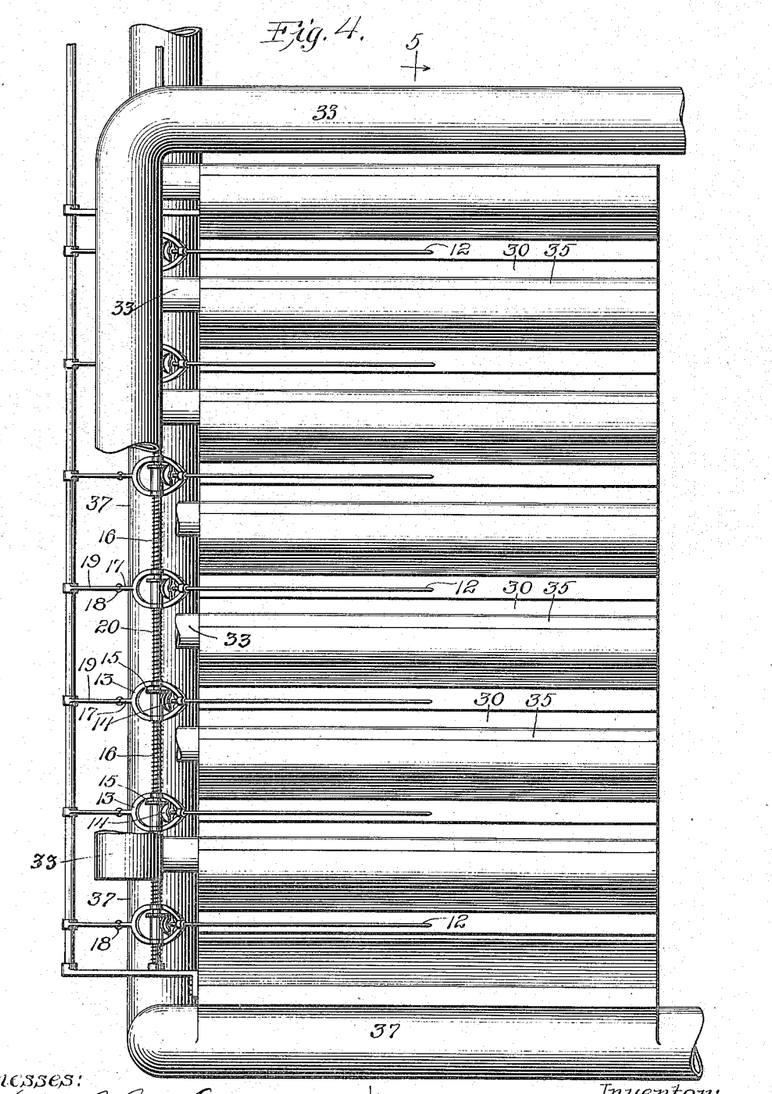
Fig. 4, a detail showing one set of picker members and the manner of mounting the same, and their relation to the air ducts for supplying pressure to remove the cotton from the members and for conveying the removed cotton to a receptacle.

When the picker teeth are withdrawn from picking position, they lie within the troughs 30, as best shown in Figs. 4 and 5, and when in such position, the draft of air coming from the nozzle 32 will remove the cotton from said teeth and force it into the chamber 29. This chamber may, if desired, be closed at its lower end by a flap valve 36, which will be adapted to open after a certain accumulation of cotton has been placed thereon, although this feature of the device may be employed or not as desired without affecting the operation of the picker mechanism. The cotton, however, will pass from the chamber 29 into a pipe 37, which is in communication, as best shown in Fig. 1, with a fan 38; and the pipe 37 leads to a receptacle or bag 39. When the teeth are swung out of picking position, it is deemed desirable to change their direction of rotation, such a change serving to loosen the picked cotton from the teeth, so that the air can more easily remove it therefrom.

Figure 7:
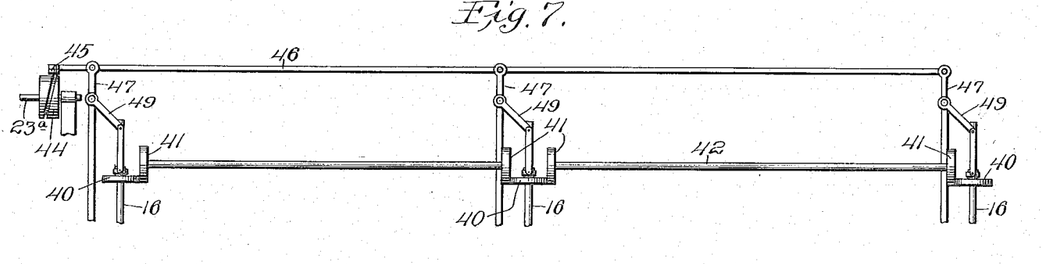
Fig. 7, a detail of the connection between the shafts carrying the picker members and the driving means for said shaft.
Figure 8:
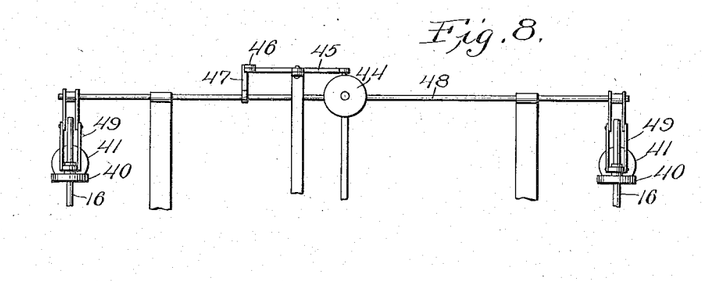
Fig. 8, a view of the parts shown in Fig. 7, looking from the side of Fig. 7.

The mechanism employed for rotating the picker teeth will be readily understood by reference to Figs. 4 and 7, in the latter of which the rod 16 is shown as provided at one end with a disk 40, which is in engagement with a disk 41 on a shaft 42, said latter shaft, as shown in Fig. 3, being connected by belts 43, or other suitable connections, to the engine shaft 25. In order to effect the reversal of the direction of rotation of said teeth, I show one form of mechanism in which I employ a cam 44, best shown in Fig. 3, which is attached to the shaft carrying the gear 23. Extending from said cam is a pivoted link 45, which connects with a sliding bar 46, said bar being provided with crank arms 47 connected to rock-shafts 48, which latter shafts in turn are connected by crank arms 49 to the shafts 16. Obviously, as the cam revolves, the lever 45 will swing to reciprocate the bar or lever 46, rock the shafts 48, move the crank arms 49, and pull the disk 40 to the opposite side of the center of the disk, thereby reversing the direction of the rotation of the shafts 16. The movements of the disk 40 across the disk 41 will be in synchrony with the in and out movements of the picker teeth, whereby, when in picking position, the picker members will be revolved in one direction, and when out of picking position will be revolved in an opposite direction, the first movement being in a direction to wind the cotton upon the members, and the second being to unwind it therefrom.

The operation briefly is as follows: As the machine traverses a field, the picker members are moved into and out of picking position in the manner described. When they are out of picking position and lying within the troughs 30, their direction of rotation is reversed and the blast of air coming out of the nozzles 32 serves to strip the cotton from the teeth and force it into the pipe 29, from whence it passes to the pipe 37 and thence is blown to the receptacle 39. When several sets of picker mechanisms are used, it is, of course, understood that while one set is in picking position, the next adjacent set is out of picking position, such intermittency of the operation of the mechanisms occurring all along the machine.

I claim:

1. In a cotton picker, the combination of a supporting frame embodying side portions arranged to lie upon opposite sides of a row of plants, vertically extending rock shafts upon each of said side portions arranged in opposed relation and held against relative bodily movement with respect to said side portions, a series of horizontally extending pivotally mounted picker members arranged in series longitudinally of said shafts, connections between said shafts and picker members, means operatively connected for imparting an interrupted rocking movement to said shafts whereby said picker members are moved toward and from the center of the machine, said interruptions occurring when said picker members are at the extremities of their movement, means for removing the picked cotton from the picker member, and means for rotating said picker members about their longitudinal axis, substantially as described.

2. In a cotton picker, the combination of a supporting frame embodying side portions arranged to lie upon opposite sides of a row of plants, vertically extending rock shafts upon each of said side portions arranged in opposed relation and held against relative bodily movement with respect to said side portions, a series of horizontally extending pivotally mounted picker members arranged in series longitudinally of said shafts, connections between said shafts and picker members, means operatively connected for imparting an interrupted rocking movement to said shafts whereby said picker members are moved toward and from the center of the machine, said interruptions occurring when said picker members are at the extremities of their movement and being of longer duration while the picker members are in picking position than while they are out of picking position.

3. In a cotton picker, the combination of a supporting frame embodying side portions arranged to lie upon opposite sides of a row of plants, vertically extending rock shafts on each of said side portions arranged in opposed relation and held against relative bodily movement with respect to said side portions, a series of horizontally extending pivotally mounted picker members arranged in series longitudinally of said shafts, one series for each shaft, flexible connections between said shafts and picker members, means operatively connected for imparting an interrupted rocking movement to said shafts whereby said picker members are moved toward and from the center of the machine, means for removing the picked cotton from the picker members and means for rotating said picker members about their longitudinal axis, substantially as described.

4. In a cotton picker, the combination of a supporting frame embodying side portions arranged to lie upon opposite sides of a row of plants, vertically extending rock shafts on each of said side portions arranged in opposed relation and held against relative bodily movement with respect to said side portions, a series of horizontally extending pivotally mounted picker members arranged in series longitudinally of said shafts, one series for each shaft, connections between said shafts and picker members, resilient means for spacing said picker members apart upon said shafts, means operatively connected for imparting an interrupted rocking movement to said shaft whereby said picker members are moved toward and from the center of the machine, means for removing the picked cotton from the picker members, and means for rotating said picker members about their longitudinal axis, substantially as described.

5. In a cotton picker, the combination of a supporting frame embodying side portions arranged to lie upon opposite sides of a row of plants, vertically extending rock shafts on each of said side portions arranged in opposed relation, a series of horizontally extending pivotally mounted picker members arranged in series longitudinally of said shafts, one series for each shaft, flexible connections between said shafts and picker members, resilient means for spacing said picker members apart upon said shafts, means operatively connected for imparting interrupted rocking movement whereby said picker members are moved toward and from the center of the machine, means for removing the picked cotton from the picker members, and means for rotating said picker members about their longitudinal axis, substantially as described.

6. In a cotton picker, the combination of a supporting frame embodying side portions arranged to lie on opposed sides of a row of plants, vertically extending rock shafts upon each of said side portions arranged in opposed relation, a series of horizontally extending pivotally mounted picker members arranged in series longitudinally of said shafts, one series for each shaft, connections between said shafts and picker members, a series of horizontally extending troughs secured to said side portions, means for rocking said shafts with an interrupted rocking movement whereby said picker members are moved into and out of picking position, said members when out of picking position lying within said troughs, means for revolving the picker members about their longitudinal axis, means for removing the picked cotton from the picker members and delivering it into said troughs, a conduit communicating with said troughs, a receptacle for the cotton, and means for conveying said cotton from said conduit to said receptacle, substantially as described.

7. In a cotton picker, the combination of a supporting frame embodying side portions arranged to lie on opposed sides of a row of plants, vertically extending rock shafts upon each of said side portions arranged in opposed relation, a series of horizontally extending pivotally mounted picker members arranged in series longitudinally of said shafts, one series for each shaft, connections between said shafts and picker members, resilient means for spacing the members apart upon said shafts, a series of horizontally extending troughs secured to said side portions, means for rocking said shafts with an interrupted rocking movement whereby said picker members are moved into and out of picking position, said members when out of picking position lying within said troughs, means for revolving the picker members about their longitudinal axis, means for removing the picked cotton from the picker members and delivering it into said troughs, a conduit communicating with said troughs, a receptacle for the cotton, and means for conveying said cotton from said conduit to said receptacle, substantially as described.

8. In a cotton picker, the combination of a supporting frame embodying side portions arranged to lie on opposed sides of a row of plants, vertically extending rock shafts upon each of said side portions arranged in opposed relation, a series of horizontally extending pivotally mounted picker members arranged in series longitudinally of said shaft, one series for each shaft, flexible connections between said shafts and picker members, resilient means for spacing the members apart upon said shafts, a series of horizontally extending troughs secured to said side portions, means for rocking said shafts with an interrupted rocking movement whereby said picker members are moved into and out of picking position, said members when out of picking position lying within said troughs, means for revolving the picker members about their longitudinal axis, means for removing the picked cotton from the picker member and delivering it into said troughs, a conduit communicating with said troughs, a receptacle for the cotton, and means for conveying said cotton from said conduit to said receptacle, substantially as described.

9. In a cotton picker, the combination of a supporting frame embodying side portions arranged to lie on opposite sides of a row of plants, vertically extending rock shafts upon each of said side portions arranged in opposed position, a series of horizontally extending pivotally mounted picker members arranged in series longitudinally of said shafts, one series for each shaft, connections between said shafts and picker members, a series of horizontally extending troughs secured to said side portions, means for rocking said shafts with an interrupted rocking movement, whereby said picker members are moved into and out of picking position, said members when out of picking position lying within said troughs, means for directing blasts of air to said troughs to remove the picked cotton from the picker members, a conduit communicating with said troughs, a receptacle for the cotton, and means for delivering blasts of air through said conduits to carry the cotton into the receptacle, substantially as described.

10. In a cotton picker, the combination of a frame embodying side portions arranged to lie upon opposite sides of a row of plants, vertically extending rock shafts on said side portions, a series of horizontally extending picker members, a shaft lying parallel to each of said rock shafts serving as a bearing for said picker members, both of said shafts being held against relative bodily movement with respect to said side portions, connections between said picker members and rock shafts, means for actuating said rock shafts to swing said members into and out of picking position about said bearing shafts as centers and means for removing the picked cotton from the picker members, substantially as described.

11. In a cotton picker, the combination of a frame, embodying side portions arranged to lie upon opposite sides of a row of plants, vertically extending rotatable shafts on said side portions, said shafts being held against relative bodily movement with respect to said side portions, a series of horizontally extending picker members pivotally mounted on each of said shafts, means for rocking the picker members about said shafts to move them in and out of picking position, means operatively connected for rotating said shafts and connections between said shafts and picker members whereby said members are rotated about their longitudinal axis by the rotating movement of said shafts, substantially as described.

12. In a cotton picker, the combination of a frame embodying side portions arranged to lie upon opposite sides of a row of plants, rotatable shafts on said side portions held against relative bodily movement with respect to said side portions, a series of horizontally extending picker members pivotally mounted on each of said shafts, means for rocking the picker members about said shafts to move them in and out of picking position, means operatively connected for rotating said shafts, connections between said shafts and picker members whereby said members are rotated about their longitudinal axis by the rotating movement of said shafts and means for reversing the direction of rotation of said shafts when the picker members are moved out of picking position, substantially as described.

13. In a cotton picker, the combination of a frame embodying side portions arranged to lie upon opposite sides of a row of plants, a series of vertically extending rotatable shafts on said side portions held against relative bodily movement with respect to said side portions, means operatively connected for rotating said shafts, a series of yoke members pivotally mounted on each of said shafts to have independent movement thereon, a picker member carried by each of said yoke members, a series of driving members on said rotatable shafts, one driving member lying within the confines of each yoke member, a driven member on each of said picker members in operative connection with one of said driving members, and means for rocking the yoke members about said shafts whereby the picker members are moved into and out of picking position, substantially as described.

14. In a cotton picker, the combination of a frame embodying side portions arranged to lie on opposite sides of a row of plants, a series of vertically extending rotatable shafts on said side portions held against relative bodily movement with respect to said side portions, means operatively connected for rotating said shafts, a series of yoke members pivotally mounted on each of said shafts, each yoke member having independent movement thereon, a picker member carried by each of said yoke members, a series of driving members on said rotatable shafts, one driving member lying within the confines of each yoke member, a driven member on each of said picker members in operative connection with one of said driving members, means for rocking the yoke members about said shafts whereby the picker members are moved into and out of picking position, and means for reversing the direction of rotation of said shafts when the picker members are moved out of picking position, substantially as described.

15. In a cotton picker, the combination of a frame embodying side portions arranged to lie upon opposite sides of a row of plants, rotatable shafts on said side portions held against relative bodily movement with respect to said side portions, a series of horizontally extending picker members pivotally mounted on said shafts, means for rocking said picker members about said rotatable shafts as a center to move them into and out of picking position, a driving shaft for said rotatable shafts, a friction drive connection between said driving and rotatable shafts and means for automatically shifting the position of the parts constituting the drive connection whereby the direction of drive of said shafts is reversed and connections between said drive shaft and picker members, substantially as described.

16. In a cotton picker the combination of side portions arranged to lie upon opposite sides of a row of plants, a series of shafts on said side portions, held against relatively bodily movement with respect to said side portions, picker members pivotally mounted on said shafts, a crank shaft, a connection between said crank shaft and each of said picker members and means for rotating said crank shaft with an intermittent movement whereby a period of rest is given said picker members at the end of each limit of movement thereof, substantially as described.

STEPHEN S. THOMAS.

Witnesses:
C. F. CLAPP,
MARY E. TREAT.